United States Patent [19]

Steckley

[11] 4,355,568
[45] Oct. 26, 1982

[54] LIVESTOCK BARN VENTILATION SYSTEM

[76] Inventor: Dale Steckley, R.R. #2, Carstairs, Alberta, Canada, T0M 0N0

[21] Appl. No.: 213,192

[22] Filed: Dec. 4, 1980

[30] Foreign Application Priority Data

Dec. 5, 1979 [CA] Canada .................................. 341263

[51] Int. Cl.$^3$ ............................................... F24F 7/06
[52] U.S. Cl. ..................................... 98/33 A; 98/40 C
[58] Field of Search ............. 98/33 R, 33 A, 35, 38 F, 98/39, 40 C

[56] References Cited

U.S. PATENT DOCUMENTS

| | | | |
|---|---|---|---|
| 968,854 | 8/1910 | Jones | 98/39 |
| 2,901,959 | 9/1959 | Kinney | 98/40 C |
| 3,474,720 | 10/1969 | Qualley et al. | 98/33 R |
| 3,691,928 | 9/1972 | Berg, Jr. et al. | 98/33 A |
| 3,815,485 | 6/1974 | Bevsink et al. | 98/39 |

FOREIGN PATENT DOCUMENTS

| | | | |
|---|---|---|---|
| 144812 | 11/1980 | Fed. Rep. of Germany | 98/33 R |
| 332387 | 7/1930 | United Kingdom | 98/33 A |
| 540699 | 10/1941 | United Kingdom | 98/33 A |

*Primary Examiner*—William E. Wayner
*Assistant Examiner*—Harold Joyce
*Attorney, Agent, or Firm*—William R. Hinds; George H. Dunsmuir

[57] ABSTRACT

A barn ventilating system includes an inlet located centrally of the peak of the roof for admitting fresh air to a manifold, which distributes the air to each side of the barn, wherein fans blow the air into elongated, perforated plastic tubes for carrying the air along the length of the barn; and a pair of outlets also located at the peak of the roof, one at each end thereof, for discharging stale air from the barn.

1 Claim, 6 Drawing Figures

LIVESTOCK BARN VENTILATION SYSTEM

BACKGROUND OF THE INVENTION

This invention relates to a ventilating system and in particular to a livestock barn ventilating system.

The problems involved in the ventilation of livestock barns are many and complex. With most current systems, variable speed fans and continuous slot inlets are used. As the outside temperature drops, the fans work more slowly causing less air movement. As a result, more moisture is retained by the barn. In order to overcome the moisture problem, the speed of the fans can be increased. However, such a solution results in greater heating expenses. Another cold weather problem is fan freeze-up. With ventilating fans mounted on external walls, winter freezing of the fans is a distinct possibility. During warm weather, hot air should be expelled from the barn and, in general, air should be kept circulating in the barn.

Various systems have been proposed for ventilating barns. Examples of such systems are described in U.S. Pat. Nos. 1,391,217, issued to A. W. Stewart on Sept. 20, 1921; 2,189,008, issued to F. J. Kurth on Feb. 6, 1940; 2,489,515, issued to R. E. Blake et al on Nov. 29, 1949; 3,000,290, issued to V. F. Rodick et al on Sept. 19, 1961; 3,463,391, issued to A. J. T. Haegens on Aug. 26, 1969; 3,474,720, issued to R. W. Qualley et al on Oct. 28, 1969; and 3,601,096, issued to D. C. Rutherford on Aug. 24, 1971. Many of the systems, which vary in terms of efficacy and complexity, suffer from one or more of the drawbacks mentioned above. The present inventor has found that there still exists a need for an efficient ventilating system for livestock barns.

The object of the present invention is to provide a relatively simple, inexpensive ventilating system for barns.

SUMMARY OF THE INVENTION

Accordingly, the present invention relates to a barn ventilating system comprising an inlet mounted centrally in a barn roof for feeding fresh air into the barn; a manifold in said barn for receiving fresh air from said inlet and distributing the fresh air towards both sides of the barn; elongated distribution ducts connected to the outer free ends of said manifold for receiving air from the inlet and distributing the air along substantially the entire length of the barn; fan means in said manifold for drawing fresh air into the inlet and manifold, and for feeding the air into the distribution ducts; openings in said distribution ducts for discharging air into the barn along substantially the entire length thereof; and at least one outlet in said barn roof remote from said inlet for discharging air from the barn.

BRIEF DESCRIPTION OF THE DRAWINGS

The invention will now be described in greater detail with reference to the accompanying drawings, which illustrate a preferred embodiment of the invention, and wherein.

DESCRIPTION OF THE PREFERRED EMBODIMENTS

Figure 1:
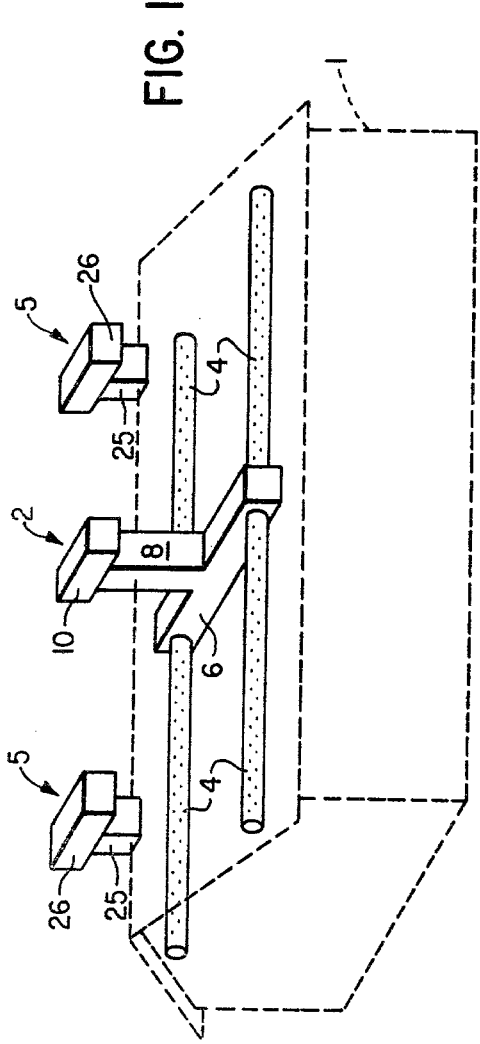
FIG. 1 is a schematic, perspective view of the barn ventilating system installed in a barn.

With reference to the drawings, the ventilating system of the present invention is intended for use in a barn 1 which does not include a ceiling. The system is a positive pressure one, i.e., air is distributed throughout the building, eliminating dead air space. The system includes a fresh air inlet generally indicated at 2 in the top centre of roof 3 of the barn 1, air distribution ducts 4, and air outlets generally indicated at 5 mounted in the peak of the roof 3 near each end thereof. Of course, the inlet 2 and outlets 5 can be positioned at other locations on the roof 3, and it is not essential that there be two outlets in the locations indicated. The main concern is to ensure complete circulation of air in the barn thereby maintaining an effective control of temperatures within the structure. Air entering the inlet 2 passes through a manifold 6 to the air distribution ducts 4, where it is distributed along substantially the entire length of the barn 1 and by fans 7.

Figure 5:
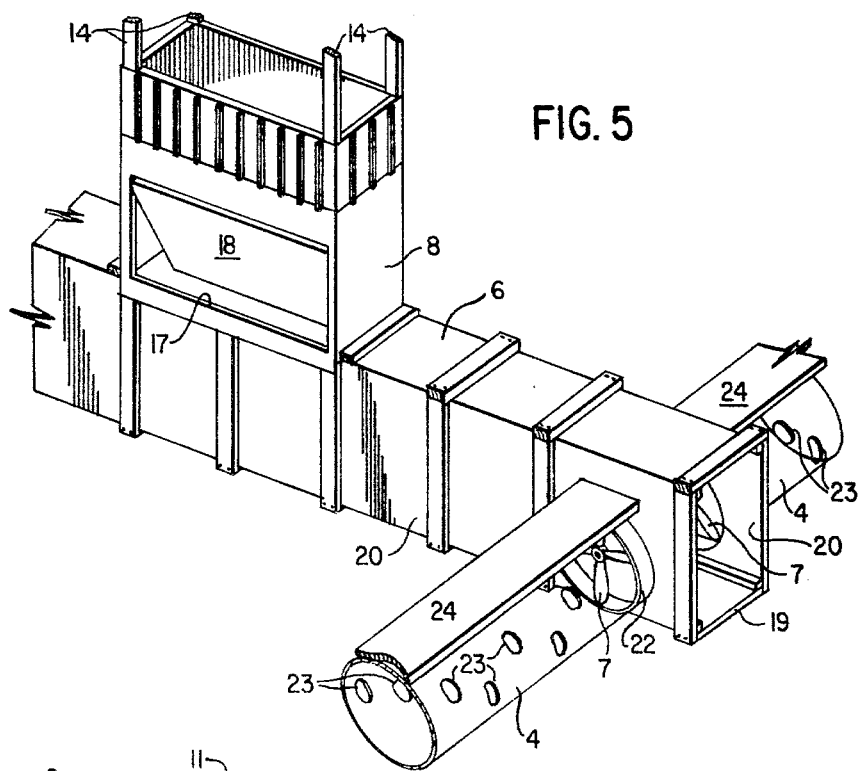
FIG. 5 is a schematic perspective view of one side of the ventilating system of FIGS. 1 to 4.
Figure 6:
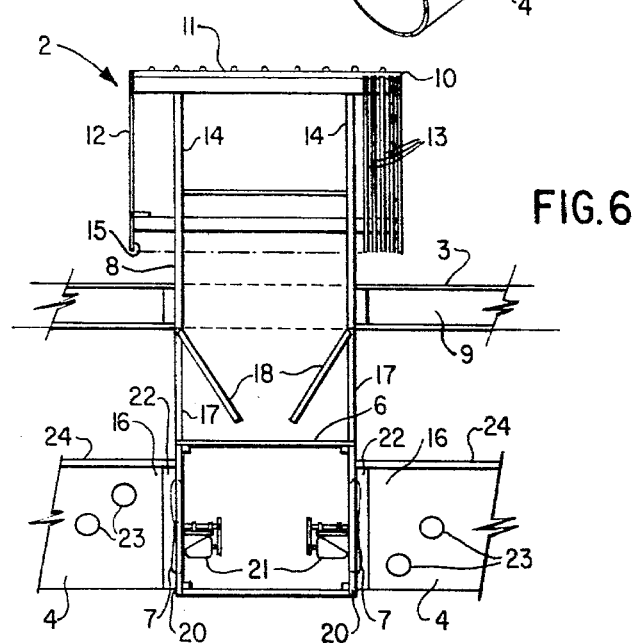
FIG. 6 is a partly sectioned elevation view of the ventilating system of FIGS. 1 to 5.

Referring to FIGS. 5 and 6, the fresh air inlet 2 is defined by a duct 8 extending vertically through a roof support 9 and the roof 3. A hood 10 is provided on the top end of the duct 8. The hood 10 is rectangular and includes a top wall or roof 11 and side walls 12 defined by a plurality of spaced apart, vertically extending slats 13. The slats 13 act as a windbreak while admitting air into the duct 8. The sides 12 of the head 10 are spaced from central, vertical frame members 14, leaving a peripheral opening 15 for admitting air to the duct.

While a variety of materials can be used in the vertical duct 8, and in the other elements of the ventilating system, the inventor has found that wooden 2"×4"'s, plywood panels, and Styrofoam (a registered trade mark for an expanded, rigid polystryrene plastic) insulation are acceptable materials for most of the structure. The distribution ducts 4 are tubes formed from polyethylene sheeting with outer ends closed by circular wooden or plastic plates (not shown).

The bottom end of the vertical duct 8 is connected to the manifold 6 for distributing the air transversely to inner ends 16 of the ducts 4. A damper, defined by an opening 17, and a hinged door 18 is provided in each side of the lower end of the duct 8 for admitting air from the barn into the manifold 6. The doors 18 may be operated manually by hand cranks (not shown), or automatically using thermostatically controlled screw jacks and a timer.

A manifold 6 is a transversely extending duct of retangular cross-sectional configuration for distributing air to both sides of the barn 1. A pair of fans 7 is provided at each outer end 19 of the manifold 6. The fans 7 are mounted in openings in each side wall 20 of the manifold 6 for blowing air towards both ends of the barn 1. The fans 7 are mounted in the manifold walls 20 in such a manner that the motors 21 extend into the manifold 6, and both outer ends of the manifold 6 are closed by doors (not shown) permitting access to the fans for servicing.

The distribution ducts 4 are connected at their inner ends 16 to flanges 22 of the fan casings. A plurality of openings 23 are provided along the entire length of the ducts 4 for discharging fresh air into the barn 1 along the length thereof. The ducts 4 are suspended from planks 24 mounted beneath the roof 3 of the barn. The planks 24 are connected to the roof supports 9 by steel strapping (not shown) which is also used to support the outer ends 19 of the manifold 6.

The outlets 5 are somewhat similar in structure to the top end of the inlet 2, and accordingly, the structure of such outlets is not illustrated in detail. Each outlet 5 includes a vertical duct 25 mounted in the peak of the roof 3 at one end thereof. A hood 26 on the upper end of the duct 25 extends beyond the sides of the duct to define a sheltered peripheral discharge opening. A damper plate 27 is pivotally mounted for rotation around a horizontal axis in each duct 25 for exhausting air from the barn 1. The damper is pressure responsive, i.e., it opens in response to air pressure within the barn 1.

Figure 2:
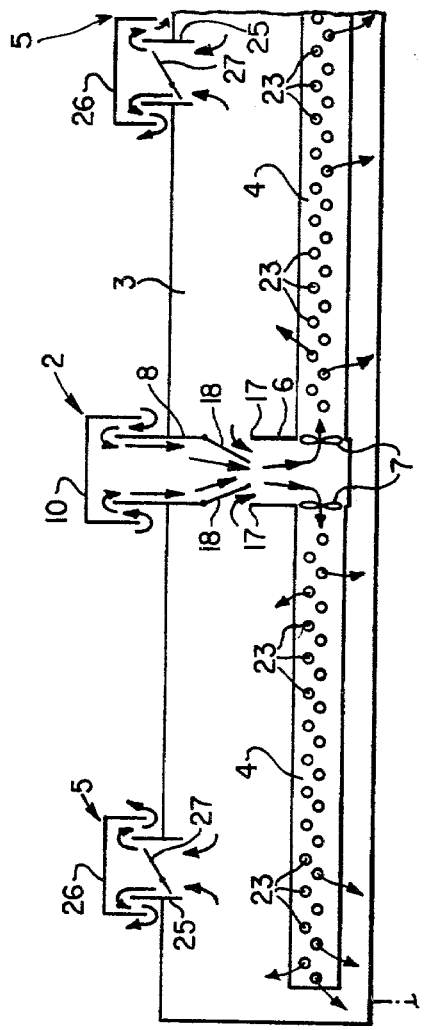
FIG. 2 is a schematic longitudinal sectional view of the ventilating system of FIG. 1.
Figure 4:
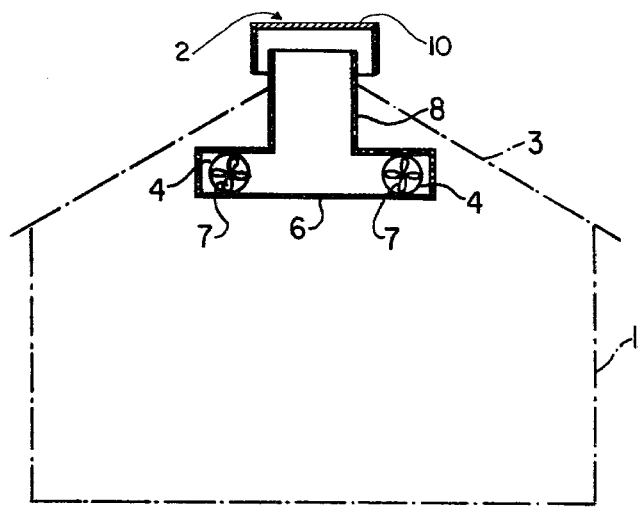
FIG. 4 is a cross section taken generally along line IV—IV of FIG. 3.
Figure 3:
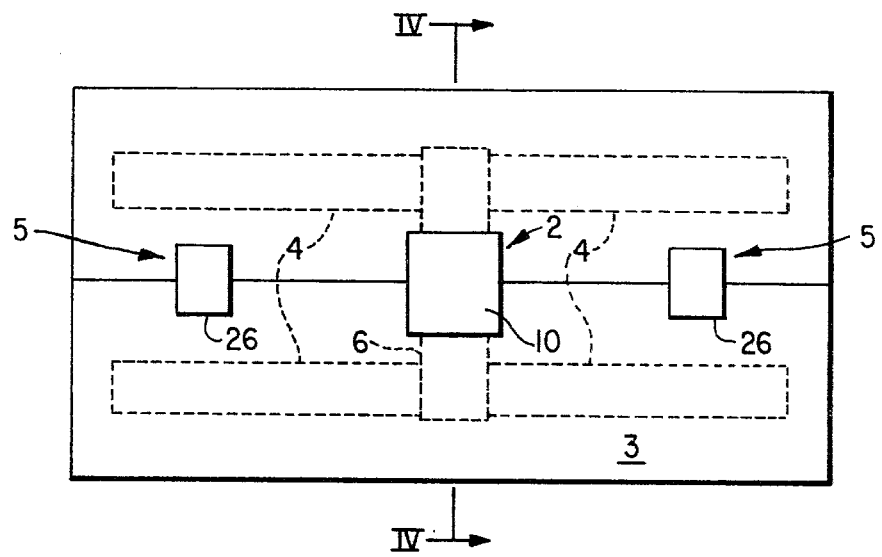
FIG. 3 is a plan view of the ventilating system of FIGS. 1 and 2.

The operation of the system should be obvious from the foregoing. However, for the sake of completeness, a short description of the operation will now be given with reference to FIGS. 1 and 2. Fresh air is continuously drawn into the barn 1 via the hood 10, vertical duct 8, manifold 6 and fans 7. The fresh air is blown through the ducts 4 and the openings 23 into the interior of the barn. Stale air is forced out of the barn by interior air pressure through the outlet ducts 25 and the peripheral opening beneath the hood 26. Thus, there is continuous air movement inside the barn 1. Temperature within the barn is controlled by the movement of the damper doors 18, which mix warm interior air with fresh air entering through inlet 2. A hot water heat exchanger (not shown) can be provided in the inlet 2 for providing supplemental heat in the winter. While two outlets 5 are shown in the drawings and described hereinbefore, depending on the barn size, one or more than two outlets can be employed so long as good air circulation within the barn is ensured.

Because the air in the barn is continuously moving, the air temperatures throughout the barn are fairly uniform. By providing fans remote from the walls or roof of the barn, winter freeze-up does not occur. It has been found that positive pressure ventilation combined with an open structure, i.e., a barn without a ceiling results in relatively good hot air expulsion in the summer.

Further modifications and alternative embodiments of the invention will be apparent to those skilled in the art in view of the foregoing description. Accordingly, this description is to be construed as illustrative only and is for the purpose of teaching those skilled in the art, the manner of carrying out the invention. It is further understood that the form of the invention herewith shown and described is to be taken as the presently preferred embodiment. Various changes may be made in the shape, size and general arrangement of components, for example, equivalent elements may be substituted for those illustrated and described herein, parts may be used independently of the use of other features, all as will be apparent to one skilled in the art after having the benefits of the description of the invention.

What I claim is:

1. A barn ventilating system comprising a vertically oriented, hood-protected inlet duct mounted centrally in a barn roof for feeding fresh air into the barn; a manifold in said barn coupled to said inlet duct for receiving fresh air from said inlet duct and distributing the fresh air toward both sides of the barn; elongated distribution ducts comprising plastic tubes connected to openings in the outer free ends of said manifold and extending normally to said manifold and in opposite directions therefrom for receiving air from the inlet duct and distributing the air along substantially the entire length of the barn; elongate supports extending along the upper surface of, and connected to, said plastic tubes for supporting said tubes from the barn roof; fan means in said manifold for drawing fresh air into the inlet duct and hence into the manifold, and for feeding the air into said distribution ducts, said fan means being located adjacent the outer free ends of said manifold generally in said openings and aligned with the connected ends of respective ones of said distribution ducts, and said manifold having removable access closures at its outer free ends for permitting ready access to said fans; recirculation openings in said vertical duct between said manifold and the barn roof, and hence lying upstream of said fan means, controllable hinged doors mounted on said inlet duct for selectively varying the open or closed state of said recirculation openings, and hence the ratio of outside air to inside air passed to said manifold and hence to said fan means; openings in said distribution ducts for discharging air into the barn along substantially the entire lengths thereof; at least one hood-protected outlet located generally at the uppermost point of the roof of the barn remote from said inlet duct for discharging air from the barn; and a pressure responsive closure member in said outlet.

* * * * *